US008568226B2

(12) United States Patent
Smith et al.

(10) Patent No.: US 8,568,226 B2
(45) Date of Patent: Oct. 29, 2013

(54) MASTER CONTROL PROGRAM FOR A GAMING DEVICE

(75) Inventors: Jason A. Smith, Vernon Hills, IL (US); Nevin J. Liber, Libertyville, IL (US); Mark B. Gagner, West Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 1339 days.

(21) Appl. No.: 11/995,384

(22) PCT Filed: Jul. 17, 2006

(86) PCT No.: PCT/US2006/027661

§ 371 (c)(1), (2), (4) Date: Jan. 11, 2008

(87) PCT Pub. No.: WO2007/015800

PCT Pub. Date: Feb. 8, 2007

(65) Prior Publication Data

US 2008/0214299 A1 Sep. 4, 2008

Related U.S. Application Data

(60) Provisional application No. 60/700,939, filed on Jul. 20, 2005.

(51) Int. Cl.
*A63F 9/24* (2006.01)
*A63F 13/00* (2006.01)

(52) U.S. Cl.
USPC ............... 463/29; 463/43; 380/251; 380/277; 380/281; 380/283; 380/284; 380/285; 380/286

(58) Field of Classification Search
USPC .............. 463/29, 43; 380/281, 277, 283, 284, 380/285, 286
See application file for complete search history.

(56) References Cited

U.S. PATENT DOCUMENTS

| | | | | |
|---|---|---|---|---|
| 5,948,112 | A * | 9/1999 | Shimada et al. | 714/16 |
| 6,106,396 | A * | 8/2000 | Alcorn et al. | 463/29 |
| 6,685,567 | B2 * | 2/2004 | Cockerille et al. | 463/43 |
| 2003/0216172 | A1 * | 11/2003 | LeMay et al. | 463/29 |

OTHER PUBLICATIONS

"International Search Report for Application No. PCT/US2006/27661 date mailed Dec. 6, 2006", 4 pgs.
"Written Opinion of the International Searching Authority for Application No. PCT/US2006/27661, date mailed Dec. 6, 2006", 8 pgs.

* cited by examiner

*Primary Examiner* — Arthur O. Hall
*Assistant Examiner* — Jasson Yoo
(74) *Attorney, Agent, or Firm* — Schwegman, Lundberg & Woessner, P.A.

(57) ABSTRACT

A gaming device master control program is described herein. In one embodiment, the master control program performs operations including starting one or more gaming applications that include one or more gaming application processes. The master control program can also monitor the gaming application processes and determine, based on the monitoring, that fault recovery operations are needed. The master control program can also perform the fault recovery operations.

19 Claims, 10 Drawing Sheets

MASTER CONTROL PROGRAM FOR A GAMING DEVICE

RELATED APPLICATIONS

This application is a U.S. National Stage Filing under 35 U.S.C. 371 from International Patent Application Serial No. PCT/US2006/027661, filed Jul. 17, 2006, and published on Feb. 8, 2007 as WO 2007/015800 A1, which claims the priority benefit of U.S. Provisional Application Ser. No. 60/700,939 filed Jul. 20, 2005, the contents of which are incorporated herein by reference.

FIELD

This invention relates generally to the field of wagering game network devices and more particularly to the field of fault recovery in wagering game network devices.

COPYRIGHT

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright 2006, WMS Gaming, Inc.

BACKGROUND

Description of Related Art

Modern gaming machines (a.k.a. wagering game machines) are becoming increasingly complex, as they are continuously incorporating new technologies. As the gaming industry moves toward commercial operating systems and networking technologies, techniques for verifying system integrity and security are becoming increasingly important. Threats may be accidental (e.g., errors or malfunctions) or malicious (e.g., hackers, computer viruses, or worms).

In complex gaming systems, it can be relatively difficult to detect suspicious or abnormal operating characteristics in a timely manner. Although current gaming machines employ mechanisms for ensuring reliability of program code and resources, these mechanisms may be inadequate against sophisticated threats. For example, hackers may find ways to launch legitimate programs at inappropriate times, subvert legitimate programs by altering program arguments, or even embed viruses or worms within legitimate data files. Commercial gaming machine security software is typically designed for detecting specific known threats. Unfortunately, such security software typically cannot detect unknown threats.

Gaming machine fault recovery systems are also becoming more important. Removing gaming machines from service for repairs and maintenance can be costly. As a result, gaming machine makers are looking for fault recovery mechanisms that can gracefully recover from faults, avoiding costly downtime.

BRIEF DESCRIPTION OF THE FIGURES

The present invention is illustrated by way of example and not limitation in the Figures of the accompanying drawings in which.

OVERVIEW OF SOME EMBODIMENTS

Figure 1:
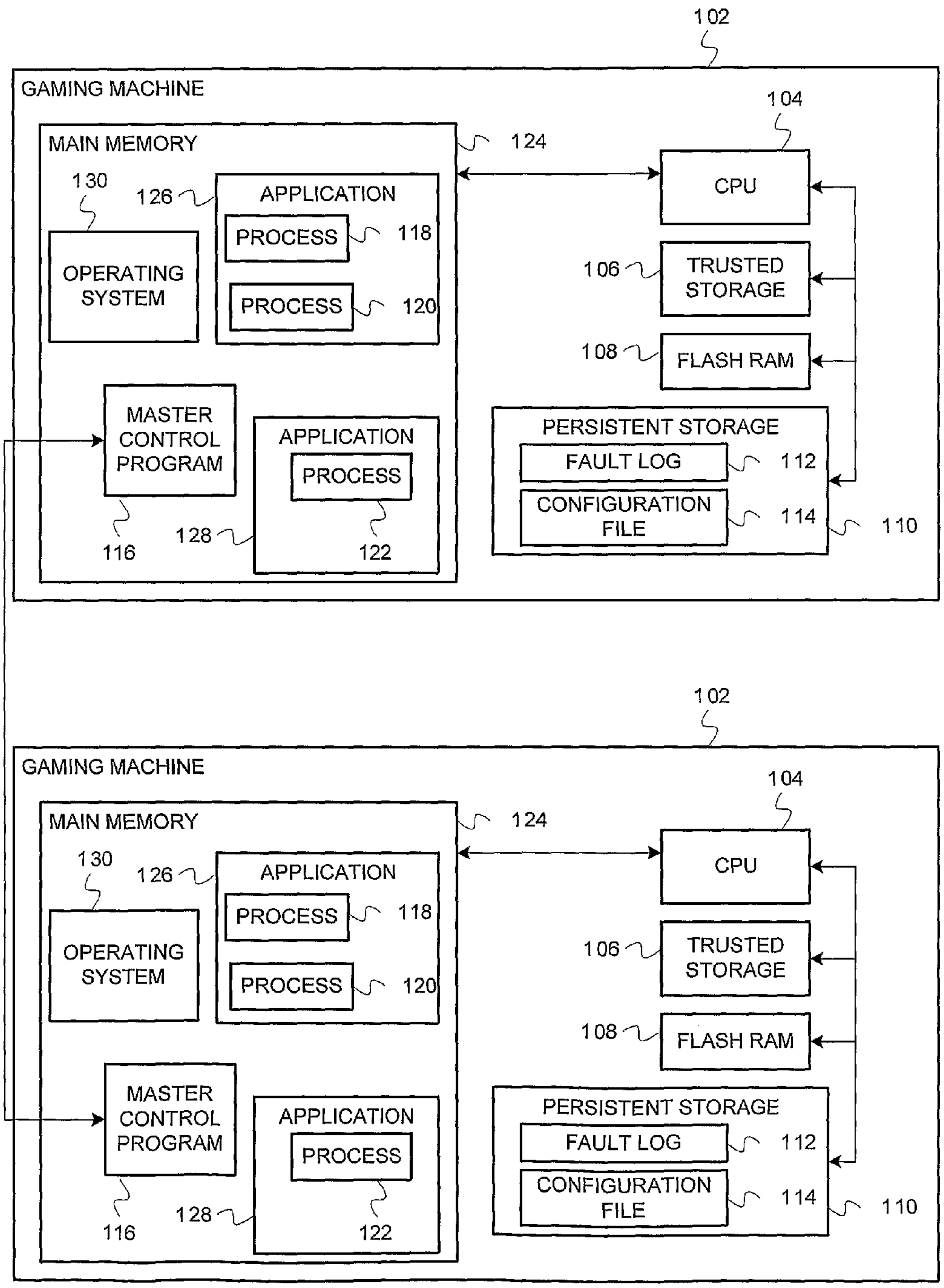
FIG. 1 is a block diagram illustrating gaming devices capable of security and fault recovery operations, according to example embodiments of the invention.

Systems, methods, and machine-readable media including instructions for a master control program for a gaming device are described herein. In one embodiment, a gaming device includes a memory unit including, one or more gaming applications; and a master control program to start the one or more gaming applications, to monitor processes of the one or more gaming applications, to monitor communication connections of the one or more gaming applications, and to perform fault recovery operations associated with abnormalities of the one or more gaming applications; and a persistent storage including, one or more fault logs to store records of the fault recovery operations; and one or more configuration files to store information for configuring the one or more gaming applications. In one embodiment, to start the one or more gaming applications, the master control program is to, cause the one or more gaming applications to begin executing, wherein each of the one or more gaming applications includes a security key; receive verifications of the security key from the one or more gaming applications; determine that a rogue application is executing because the rogue application did not send a verification of the security key; and terminate the rogue application. In one embodiment, to start the one or more gaming applications the master control program is to, transmit configuration information to ones of the gaming applications; and cause the gaming applications to begin providing services. In one embodiment, to monitor the gaming application processes, the master control program performs operations including those selected from the group consisting of determining whether all required gaming application processes are running, determining whether any unapproved processes are running, monitoring communications from the gaming application processes, and monitoring resources of a gaming machine on which the processes are running. In one embodiment, to monitor processes of the one or more gaming applications, the master control program is to perform operations selected from the group consisting of determining whether all required gaming application processes are running, determining whether any unapproved processes are running, monitoring communications from the gaming application processes, and monitoring resources of a gaming machine on which the processes are running. In one embodiment, to monitor the gaming application processes the master control program is to, determine whether utilization of resources of the gaming machine is abnormal; determine whether communications of the gaming application processes are abnormal; and if the utilization of the resources or the communications are abnormal, log abnormalities. In one embodiment, to determine that the fault recovery operations are needed, the master control program is to detect an abnormality in the gaming machine, and wherein to perform the fault recovery operations, the master control program is to, perform one of a plurality of levels of fault recovery operations; determine that the abnormality still exists; and perform an escalated level of the plurality of levels of fault recovery operations. In one embodiment, ones of the plurality of levels of fault recovery are selected from the group consisting of stopping and restarting one or more gaming application processes associated with the abnormality, stopping and restarting all gaming applications, rebooting the gaming machine, and clearing a random access memory of the gaming machine. In one embodiment, to perform the fault recovery operations the master control program is further to, determine, based on a level threshold, that the one of the plurality of levels of fault recovery operations should be performed again; perform, again, the one of the plurality of levels of fault recovery operations; and determine, based on the level threshold, that the one of the plurality of levels should not be performed again.

In one embodiment, a computer-implemented method includes starting one or more gaming applications that include one or more gaming application processes; monitoring the gaming application processes; determining, based on the monitoring, that fault recovery operations are needed; and performing the fault recovery operations. In one embodiment, the starting of the one or more gaming applications includes, causing the one or more gaming applications to begin executing, wherein each of the one or more gaming applications includes a security key; receiving verifications of the security key from ones of the one or more gaming applications; determining that a rogue application is executing because the rogue application did not send a verification of the security key; and terminating the rogue application. In one embodiment, the starting of the one or more gaming applications includes, transmitting configuration information to ones of the gaming applications; and causing the gaming applications to begin providing services. In one embodiment, the monitoring of the gaming application processes is selected from the group consisting of determining whether all required gaming application processes are running, determining whether any unapproved processes are running, monitoring communications from the gaming application processes, and monitoring resources of a gaming machine on which the processes are running. In one embodiment, the monitoring of the gaming application processes includes, determining whether utilization of resources of the gaming machine is abnormal; determining whether communications of the gaming application processes are abnormal; and if the utilization of the resources or the communications are abnormal, logging abnormalities. In one embodiment, the determining that the fault recovery operations are needed includes detecting an abnormality in the gaming machine, and wherein the performing of the fault recovery operations includes, performing one of a plurality of levels of fault recovery operations; determining that the abnormality still exists; and performing an escalated level of the plurality of levels of fault recovery operations. In one embodiment, ones of the plurality of levels of fault recovery are selected from the group consisting of stopping and restarting one or more gaming application processes associated with the abnormality, stopping and restarting all gaming applications, rebooting the gaming machine, and clearing a random access memory of the gaming machine. In one embodiment, the performing of the fault recovery operations further includes, determining, based on a level threshold, that the one of the plurality of levels of fault recovery operations should be performed again; performing, again, the one of the plurality of levels of fault recovery operations; and determining, based on the level threshold, that the one of the plurality of levels should not be performed again.

In one embodiment, a computer-readable medium including instructions, which when executed by a machine, cause the machine to perform operations includes receiving a selection of a gaming application process to be upgraded; performing a graceful shutdown of the gaming application process; modifying the gaming application process; starting the gaming application process; beginning monitoring of the gaming application process; and instructing the gaming application process to begin providing services. In one embodiment, the modifying of the gaming application process includes replacing a file with a more current file or an older file. In one embodiment, the performing of the graceful shutdown of the gaming application process includes allowing the process to complete current transactions.

DESCRIPTION OF THE EMBODIMENTS

A master control program for a gaming device is described herein. This description of the embodiments is divided into three sections. The first section describes an exemplary operating environment and system architecture, while the second section describes example system operations. The third section provides some general comments.

Hardware, Operating Environment, and Gaming Machine

This section describes example hardware and an example operating environment in which embodiments of the invention can be practiced. This section also describes an example gaming machine in more detail. Operations of the system components will be described in the next section.

Hardware and Operating Environment

FIG. 1 is a block diagram illustrating gaming devices capable of security and fault recovery operations, according to example embodiments of the invention. As shown in FIG. 1, each gaming machine 102 includes a memory unit 124 connected to a central processing unit (CPU) 104. The CPU 104 is connected to a trusted storage 106, flash random access memory (RAM) 108, and persistent storage 110. The persistent storage 110 can include one or more fault logs 112 and one or more configuration files 114. The flash RAM 108 can persistently store process state information for restoring process states.

The main memory 124 includes an application 126, which includes processes (also referred to herein as application processes) 118 and 120. Additionally, the main memory 124 includes an application 128, which includes a process 122. In one embodiment, the main memory 124 can include any number of applications and processes. The main memory 124 also includes a master control program 116 and an operating system 130.

In one embodiment, the master control program 116 can use the configuration file 114 to initiate applications and it can monitor those applications. In one embodiment, the master control program 116 monitors various application behaviors, such as inter-process communications and resource consumption. If, based on the monitoring, the master control program 116 detects faults associated with an application, it can record faults in the fault log 112. The master control program 116 can also perform security operations based on information gleaned from monitoring the applications. In addition to fault recovery and security operations, the master control program 116 can also perform operations for upgrading applications and processes, resolving service addresses, and maintaining a list of active connections.

As shown in FIG. 1, the master control program 116 can communicate with other master control programs located in remote gaming devices. The gaming machines 102 can be part of a gaming network. The gaming network can include servers, switches, routers, or other communication devices. Additionally, the gaming network can include local area networks, wide area networks, or other suitable networks.

Although FIG. 1 shows the master control program 116 as a single component, it can be subdivided into any number of components suitable for performing the operations described herein.

In one embodiment, the gaming machine 102 and/or any of its components can include tangible machine-readable media including instructions for performing operations described herein. Machine-readable media includes any mechanism that provides (i.e., stores and/or transmits) information in a form readable by a machine (e.g., a computer). For example, tangible machine-readable media includes semiconductor read only memory (ROM), semiconductor random access memory (RAM), magnetic disk storage media, optical storage media, flash memory devices, or any other suitable tangible media for providing instructions and/or data.

Although this description describes systems and operations in terms of gaming machines, the master control program can reside in any gaming network device. Operations of these and other embodiments of the invention are described in greater detail below, in the System Operations section. This description continues with a more detailed discussion of gaming machines.

Example Gaming Machine

Figure 2:
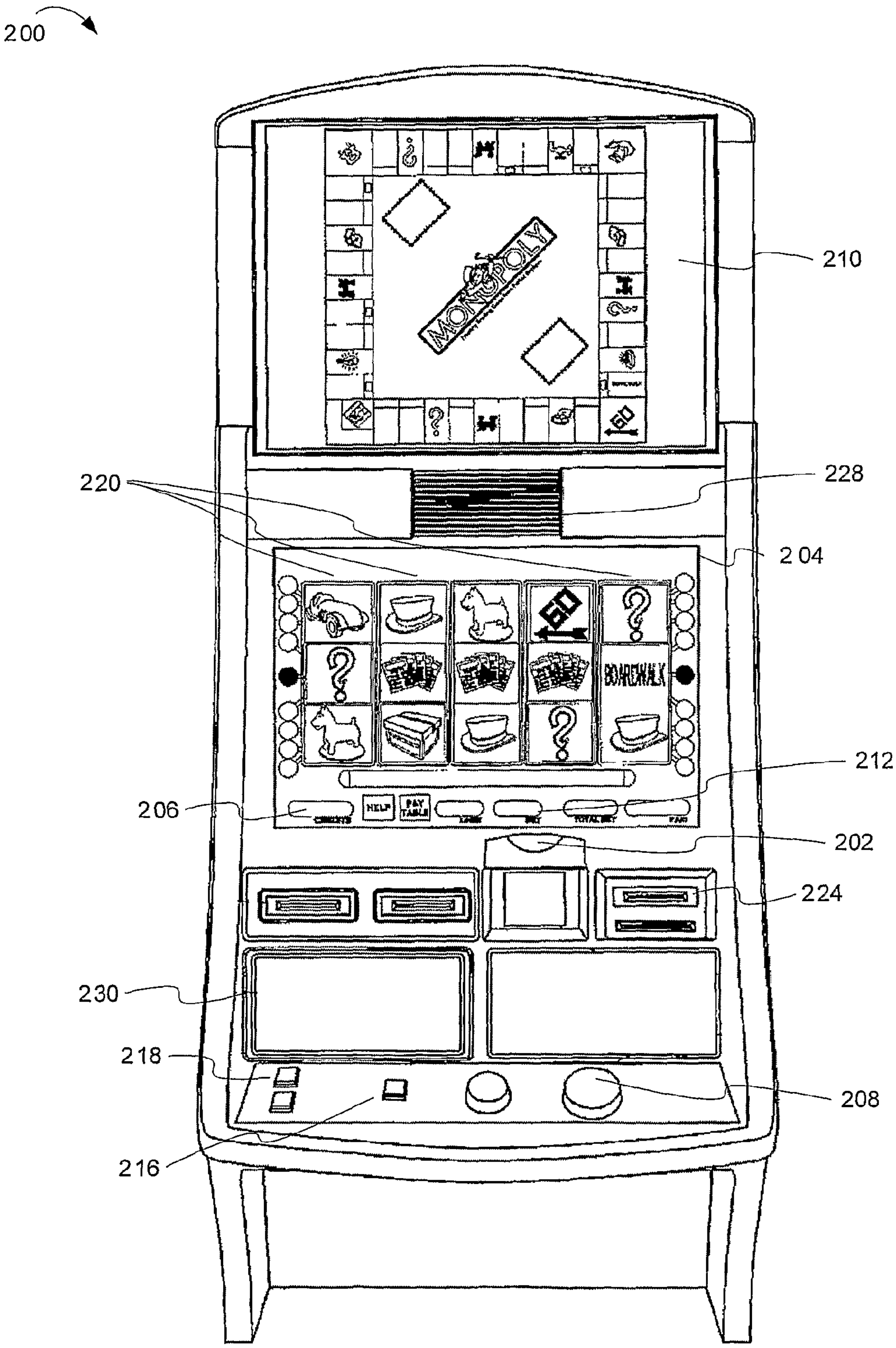
FIG. 2 is a perspective view of a gaming machine, according to example embodiments of the invention.

FIG. 2 is a perspective view of a gaming machine, according to example embodiments of the invention. As shown in FIG. 2, the gaming machine 200 can be a computerized slot machine having the controls, displays, and features of a conventional slot machine.

The gaming machine 200 can be operated while players are standing or seated. Additionally, the gaming machine 200 is preferably mounted on a stand (not shown). However, it should be appreciated that the gaming machine 200 can be constructed as a pub-style tabletop game (not shown), which a player can operate while sitting. Furthermore, the gaming machine 200 can be constructed with varying cabinet and display designs. The gaming machine 200 can incorporate any primary game such as slots, poker, or keno, and additional bonus round games. The symbols and indicia used on and in the gaming machine 200 can take mechanical, electrical, or video form.

As illustrated in FIG. 2, the gaming machine 200 includes a coin slot 202 and bill acceptor 224. Players can place coins in the coin slot 202 and paper money or ticket vouchers in the bill acceptor 224. Other devices can be used for accepting payment. For example, credit/debit card readers/validators can be used for accepting payment. Additionally, the gaming machine 200 can perform electronic funds transfers and financial transfers to procure monies from financial accounts. When a player inserts money in the gaming machine 200, a number of credits corresponding to the amount deposited are shown in a credit display 206. After depositing the appropriate amount of money, a player can begin playing the game by pushing play button 208. The play button 208 can be any play activator used for starting a wagering game or sequence of events in the gaming machine 200.

As shown in FIG. 2, the gaming machine 200 also includes a bet display 212 and a "bet one" button 216. The player places a bet by pushing the bet one button 216. The player can increase the bet by one credit each time the player pushes the bet one button 216. When the player pushes the bet one button 216, the number of credits shown in the credit display 206 decreases by one credit, while the number of credits shown in the bet display 212 increases by one credit.

A player may "cash out" by pressing a cash out button 218. When a player cashes out, the gaming machine 200 dispenses a voucher or currency corresponding to the number of remaining credits. The gaming machine 200 may employ other payout mechanisms such as credit slips (which are redeemable by a cashier) or electronically recordable cards (which track player credits), or electronic funds transfer.

The gaming machine also includes a primary display unit 204 and a secondary display unit 210 (also known as a "top box"). The gaming machine may also include an auxiliary video display 240. In one embodiment, the primary display unit 204 displays a plurality of video reels 220. According to embodiments of the invention, the display units 204 and 210 can include any visual representation or exhibition, including moving physical objects (e.g., mechanical reels and wheels), dynamic lighting, and video images. In one embodiment, each reel 220 includes a plurality of symbols such as bells, hearts, fruits, numbers, letters, bars or other images, which correspond to a theme associated with the gaming machine 200. Furthermore, as shown in FIG. 2, the gaming machine 200 includes a audio presentation unit 228. The audio presentation unit 228 can include audio speakers or other suitable sound projection devices.

In one embodiment, the gaming machine 200 can include a master control program, as described herein.

System Operations

This section describes operations performed by embodiments of the invention. The operations are described with reference to the example embodiments presented above. In certain embodiments, the operations are performed by instructions residing on machine-readable media (e.g., software), while in other embodiments, the methods are performed by hardware or other logic (e.g., digital logic).

Figure 3:
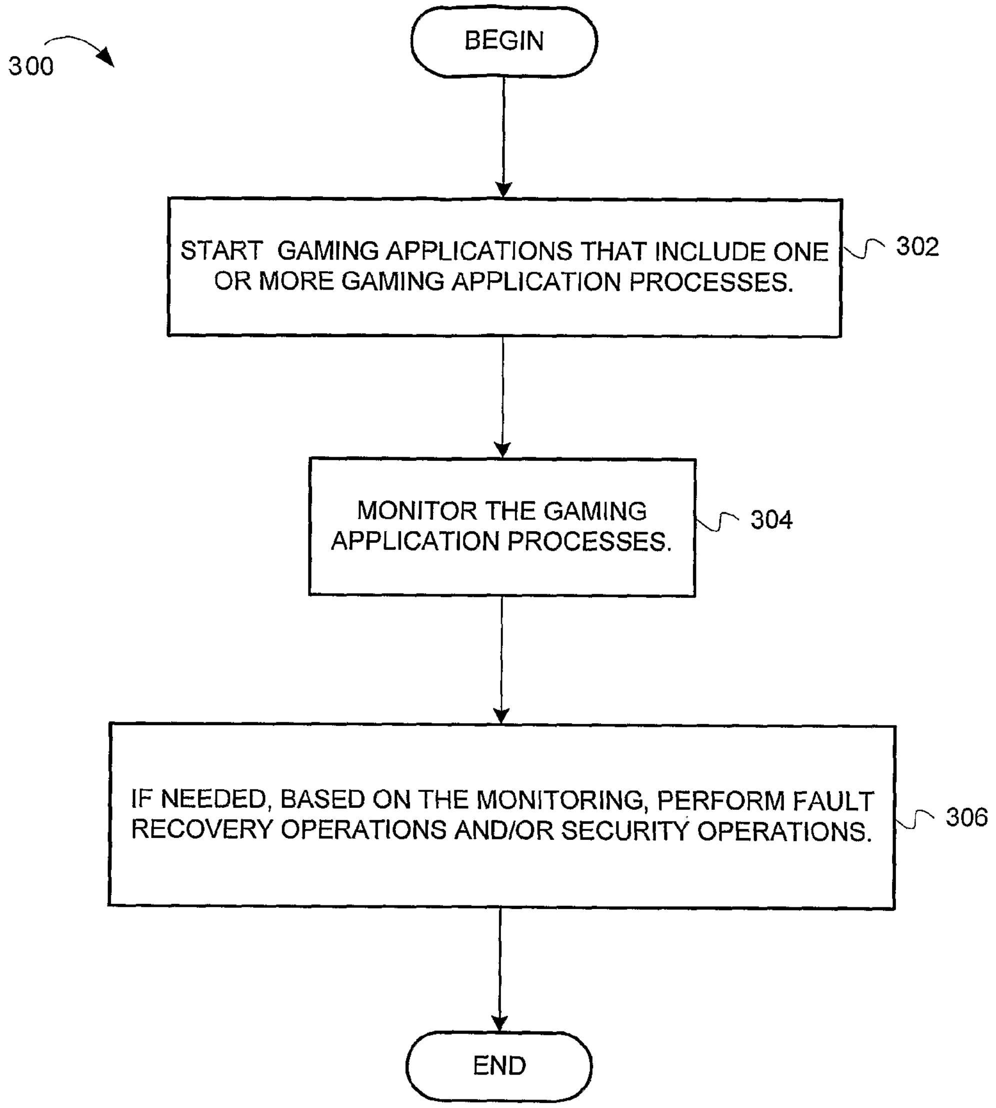
FIG. 3 is a flow diagram illustrating operations for launching and monitoring gaming applications, according to example embodiments of the invention.
Figure 6:
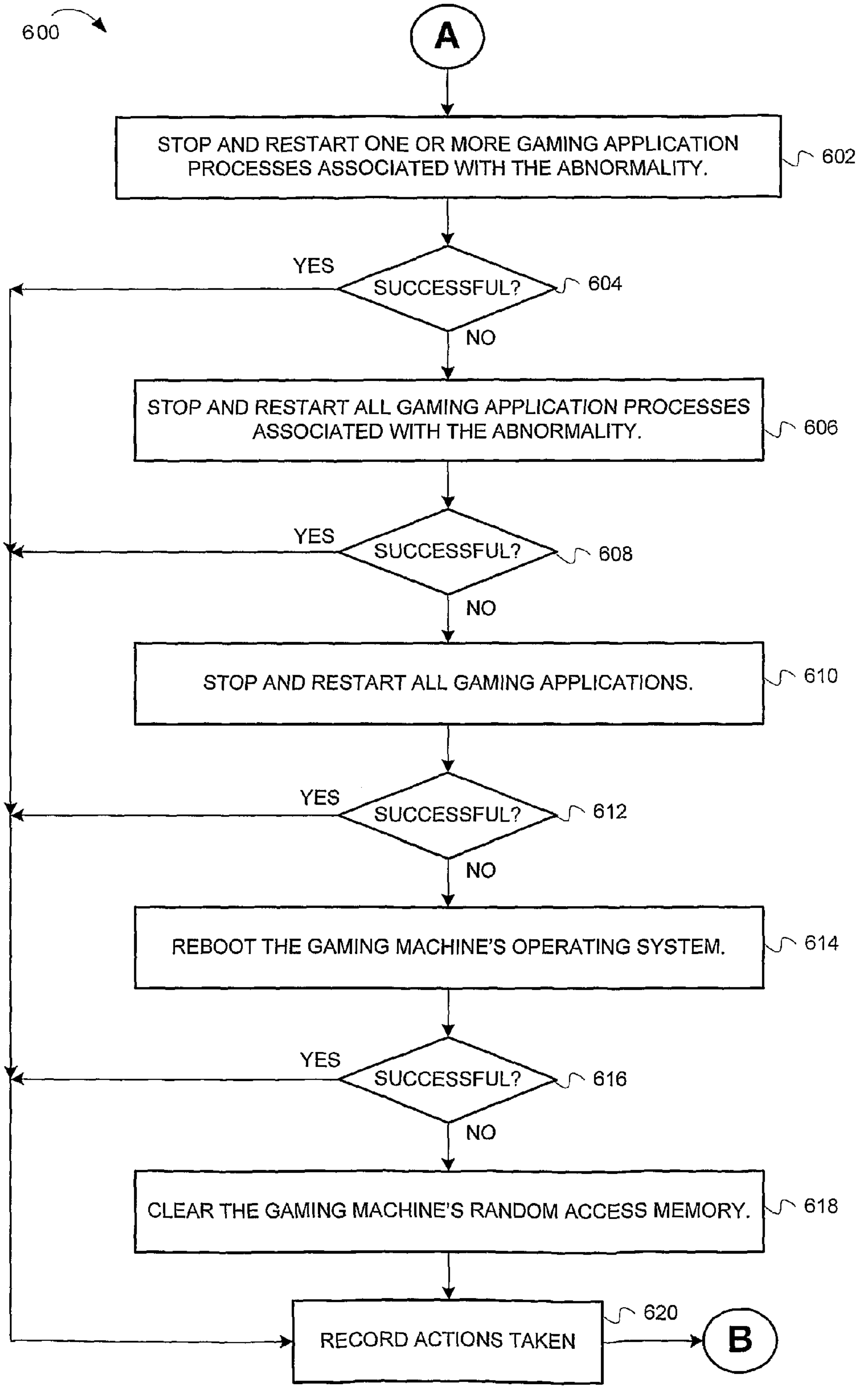
FIG. 6 is a flow diagram illustrating operations for implementing a fault recovery escalation policy, according to example embodiments of the invention.
Figure 7:
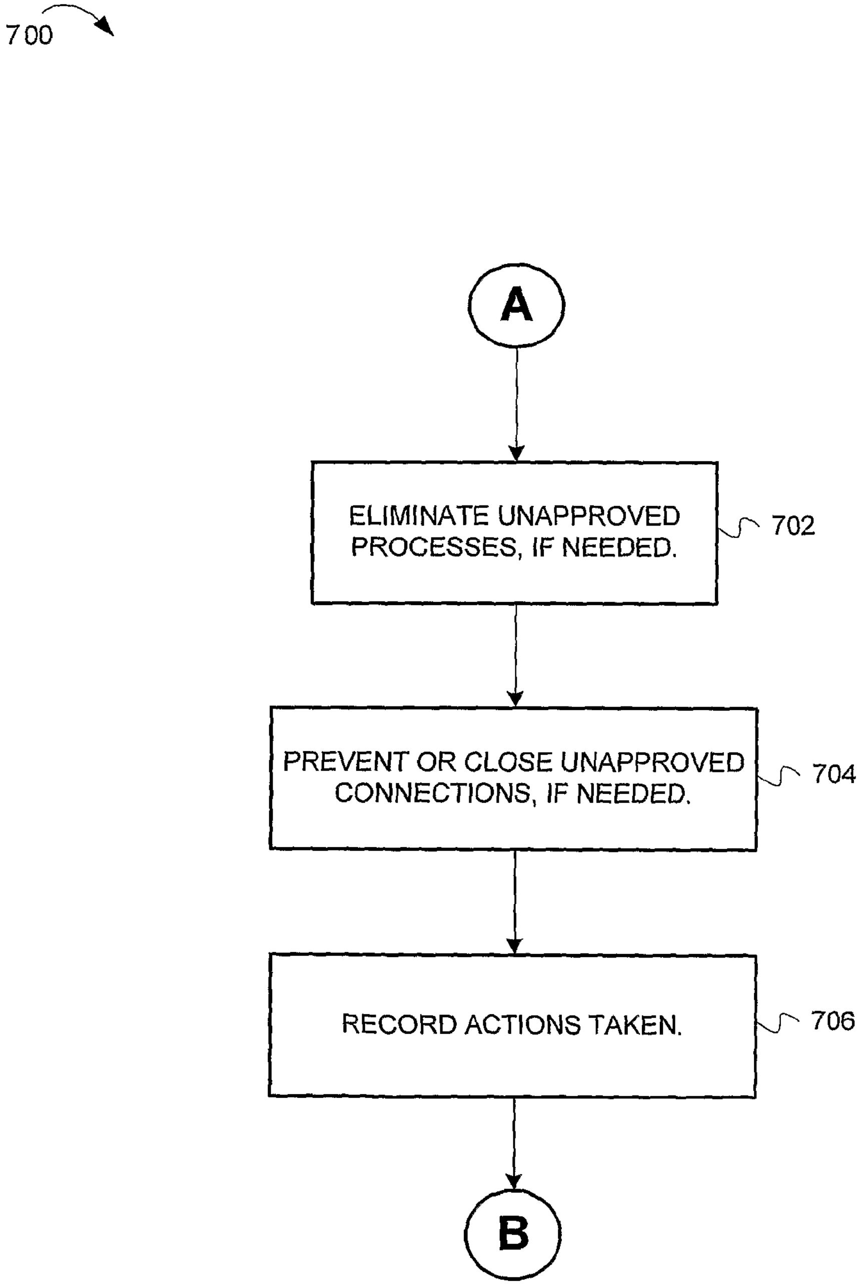
FIG. 7 is a flow diagram illustrating operations for securing a gaming machine, according to example embodiments of the invention.
Figure 8:
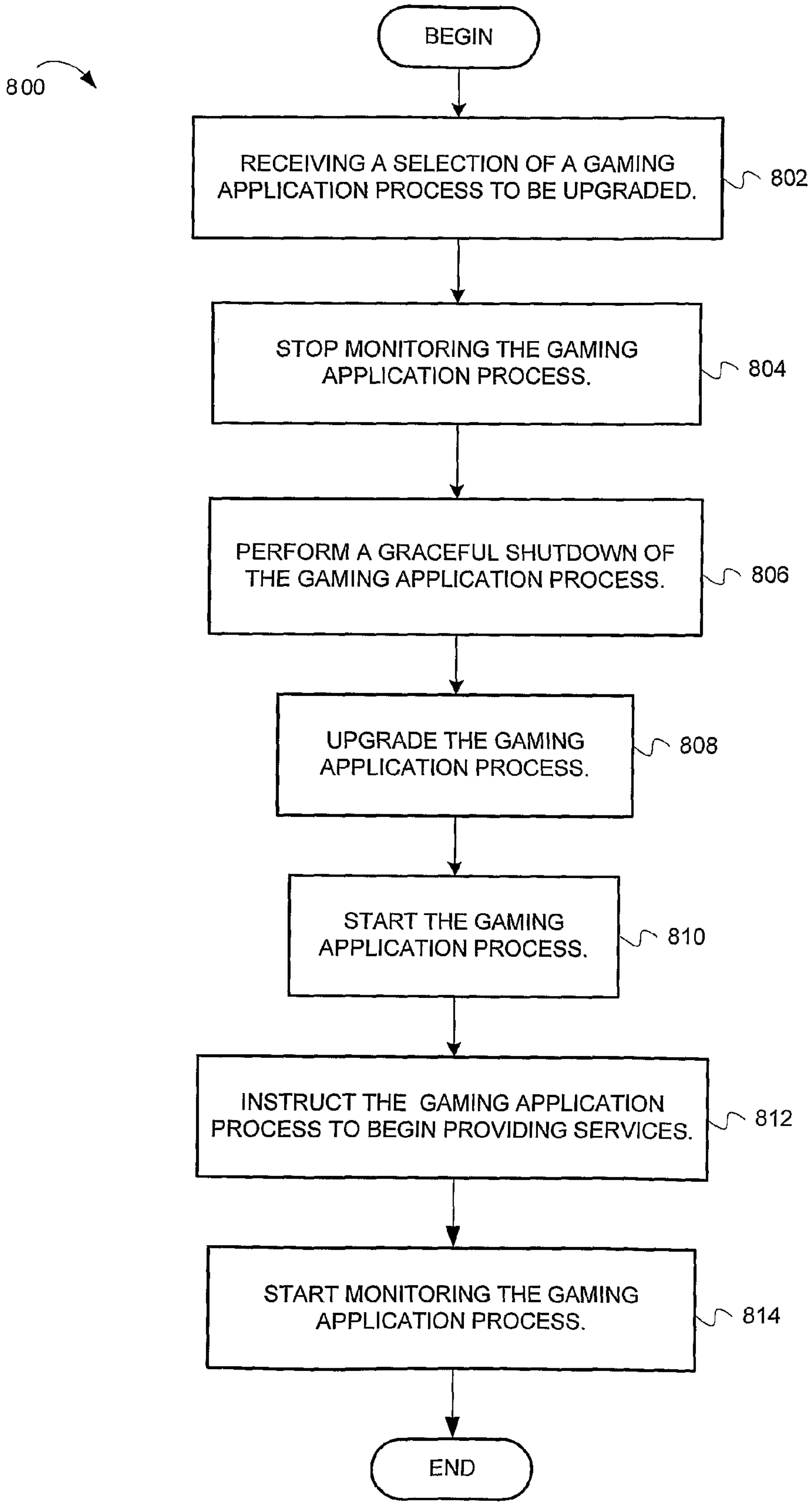
FIG. 8 is a flow diagram illustrating operations for upgrading software, according to example embodiments of the invention.
Figure 9:
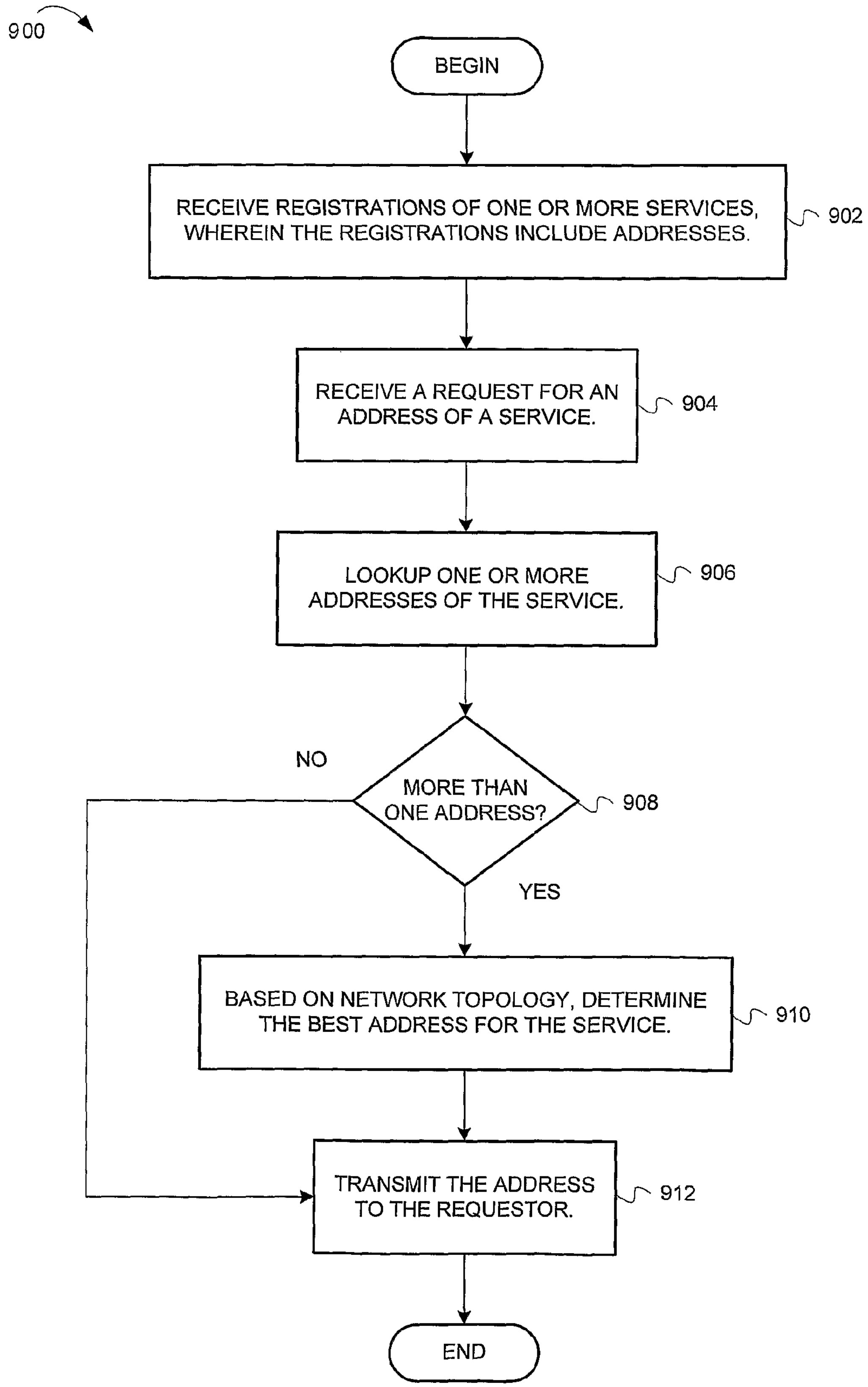
FIG. 9 is a flow diagram illustrating operations for providing naming services for gaming applications, according to example embodiments of the invention.
Figure 10:
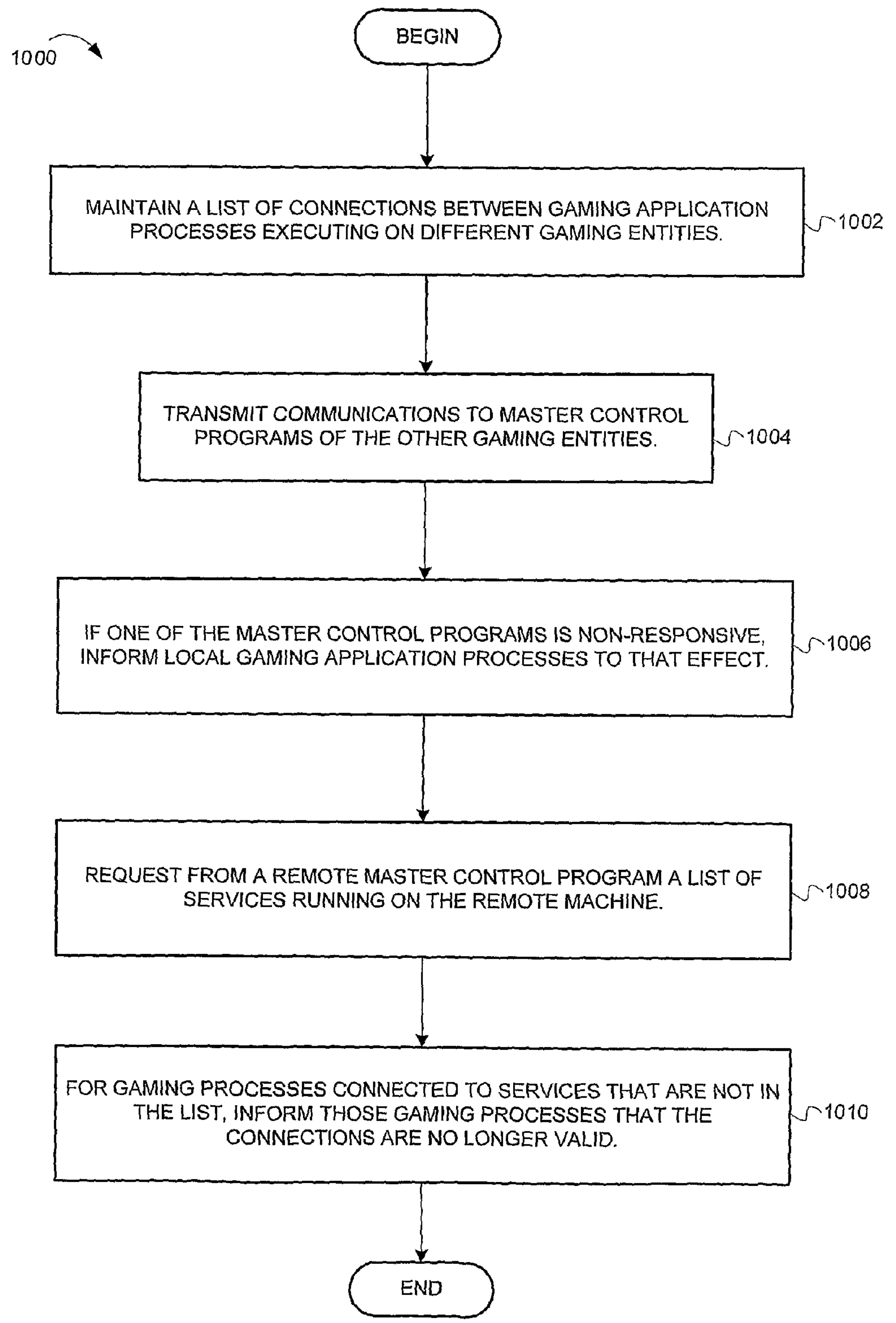
FIG. 10 is a flow diagram illustrating operations for maintaining a list of connections used by processes executing on a gaming machine, according to example embodiments of the invention.

This section presents FIGS. 3-10. In particular, FIG. 3 provides an introduction to operations for launching and monitoring applications and performing security and fault recovery operations, while FIGS. 4-7 describe those operations in greater detail. FIGS. 8-10 describe operations for upgrading applications and processes, resolving service addresses, and maintaining a list of active connections, respectively. This description continues with FIG. 3.

FIG. 3 is a flow diagram illustrating operations for launching and monitoring gaming applications, according to example embodiments of the invention. The flow 300 commences at block 302.

At block 302, the master control program 116 launches one or more gaming applications that include one or more related gaming application processes. For example, referring to FIG. 1, the master control program 116 launches the application 126. The flow continues at block 304. In one embodiment, gaming applications can also include one or more threads. Operations for launching gaming applications are described in greater detail below, in the discussion of FIG. 4.

At block 304, the master control program 116 monitors the gaming application processes. In one embodiment, the master control program 116 monitors the processes' communications and resource usage. Operations for process monitoring are described in greater detail below, in the discussion of FIGS. 5. The flow continues at block 306.

At block 306, if needed, the master control program performs fault recovery operations and/or security operations based on the monitoring performed at block 304. Fault recovery and security operations are described in greater detail below, in the discussion of FIGS. 6-7. From block 306, the flow ends.

As noted above, FIGS. 4-7 describe the operations of FIG. 3 in greater detail. This description continues with FIG. 4.

Figure 4:
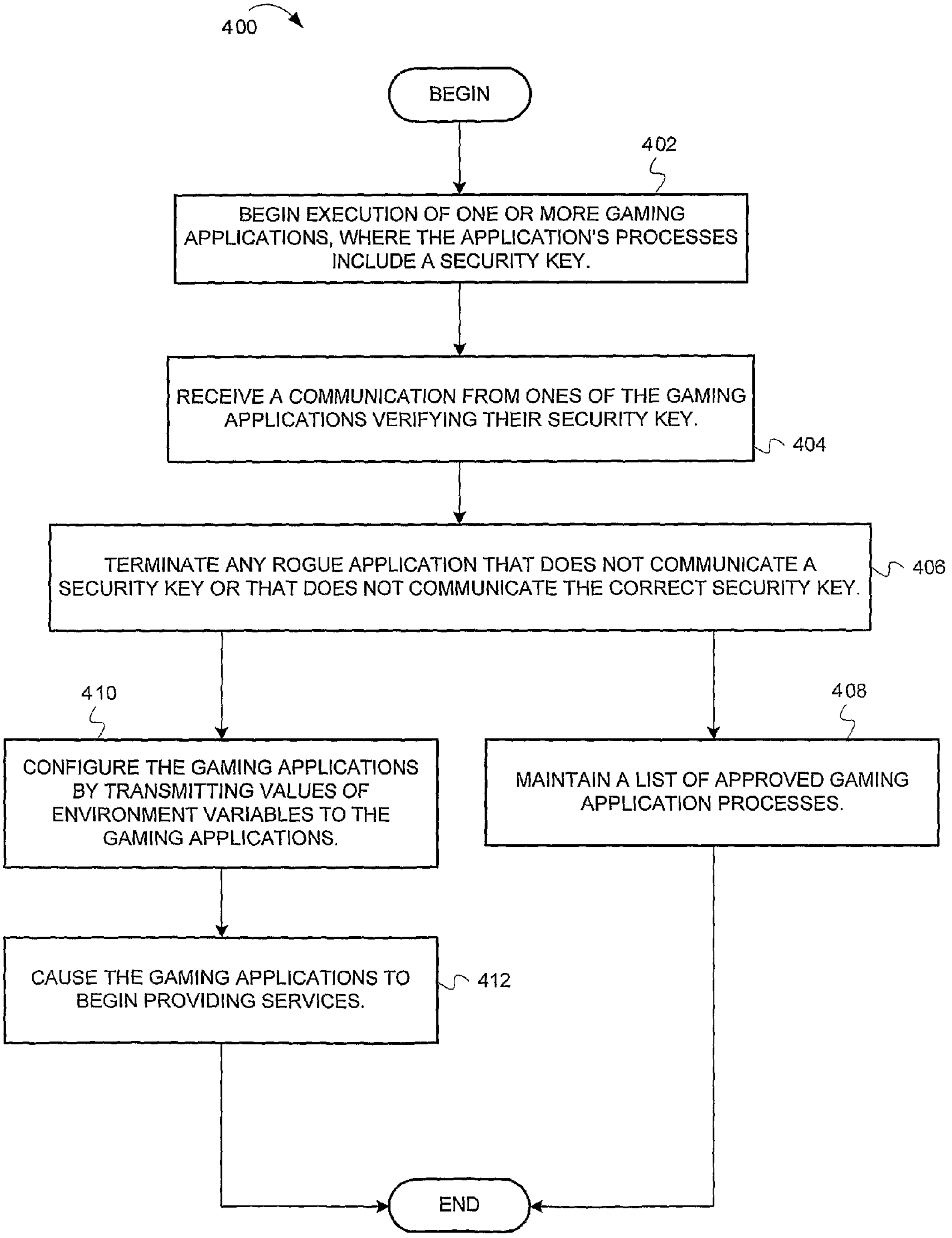
FIG. 4 is a flow diagram illustrating operations for launching gaming applications, according to example embodiments of the invention.

FIG. 4 is a flow diagram illustrating operations for launching gaming applications, according to example embodiments of the invention. The operations of the flow 400 describe block 302 in greater detail. The flow 400 begins at block 402.

At block 402, the master control program 116 begins execution of one or more gaming application processes, wherein each gaming application process includes a security key. The flow continues at block 404.

At block 404, the master control program 116 receives communications from one or more of the gaming application processes, where the communications verify the security keys. The flow continues at block 406.

At block 406, the master control program 116 terminates any rogue gaming application that does not communicate a security key, any rogue application that does not transmit the security key at a designated time, or any rogue application that does not communicate the correct security key. The flow continues and parallel at blocks 408 and 410.

At block 408, the master control program 116 maintains a list of approved gaming application processes. In one embodiment, for each gaming application process that responds with the correct security key, the master control program 116 inserts an application identifier in a list of approved gaming applications. In another embodiment, the master control program 116 retrieves the list from the configuration file 114 and removes application processes that do not respond with the correct security key. From block 408, the flow ends.

At block 410, the master control program 116 transmits configuration parameters to the gaming application processes. In one embodiment, the configuration parameters include environment variables. In one embodiment, the master control program 116 transmits the variables using sockets, unnamed pipes, named pipes, or other suitable inter-process communication mechanism. The flow continues at block 412.

At block 412, the master control program 116 causes the gaming applications to begin providing services. From block 412, the flow ends.

Figure 5:
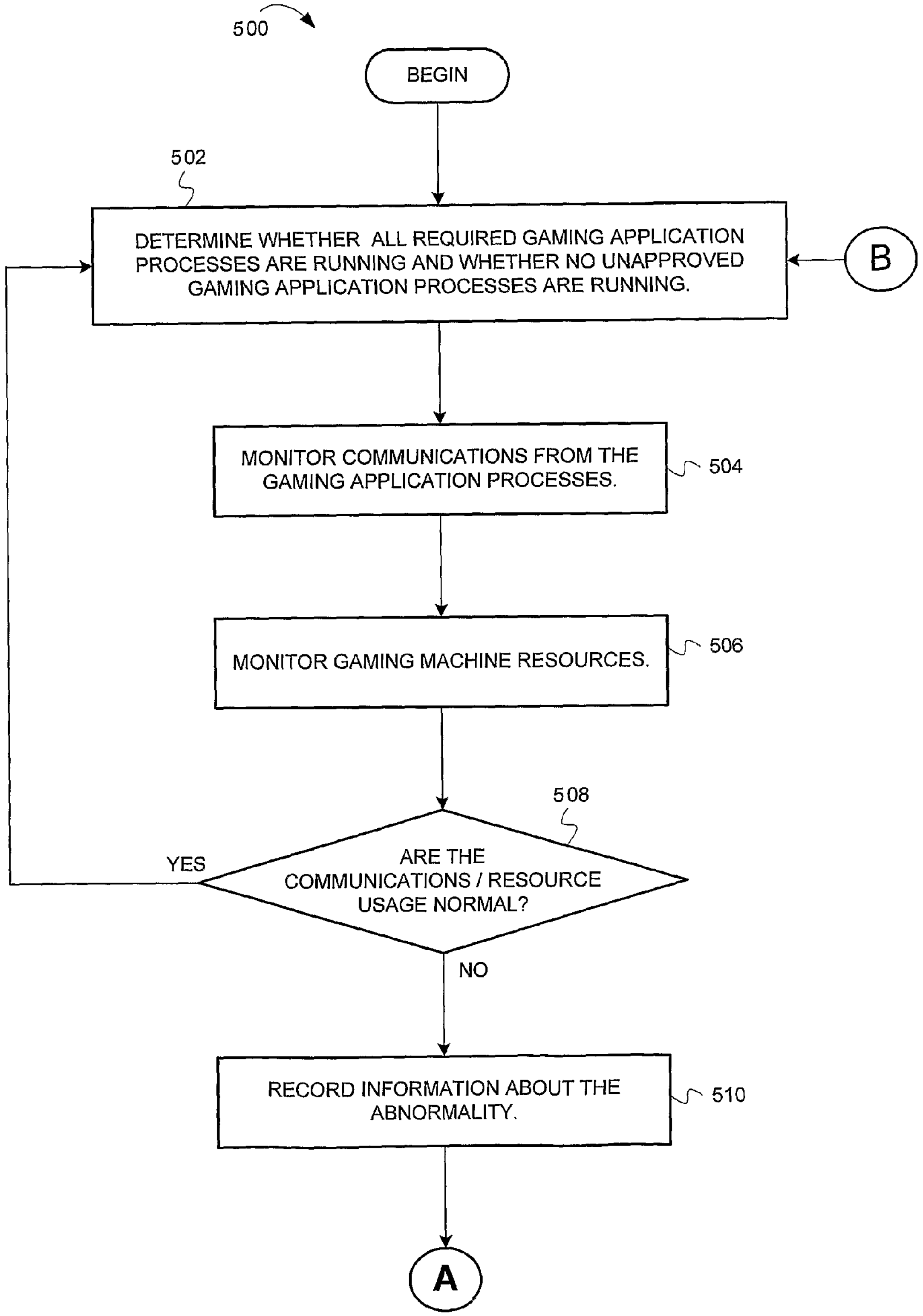
FIG. 5 is a flow diagram illustrating operations for monitoring gaming application processes, according to example embodiments of the invention.

In addition to launching gaming applications, the master control program 116 can gracefully shut-down all applications on the gaming machine 102. In one embodiment, the master control program 116 saves state information of running processes and causes the running processes to save needed data before the gaming machine 102 shuts-down. In one embodiment, when the master control program 116 gracefully shuts-down a gaming machine 102, it allows all processes to complete any outstanding work (e.g., spooling print jobs, saving application data, etc.) and prevents processes from starting new work that is not part of the shutdown process. The description proceeds with a more detailed discussion of operations for monitoring application processes. FIG. 5 is a more detailed description of the operations shown in block 304.

FIG. 5 is a flow diagram illustrating operations for monitoring gaming application processes, according to example embodiments of the invention. The flow begins at block 502.

At block 502, the master control program 116 determines whether all required gaming application processes are running and whether any unapproved gaming application processes are running. In one embodiment, the master control program 116 compares a list of currently executing processes with the list of approved processes (see discussion of block 408 for description of the "approved process list"). If a process is running, but it is not on the "approved process list," the process is considered an unapproved process. In another embodiment, the master control program 116 compares the list of currently executing processes against a list of unapproved processes. The flow continues at block 504.

At block 504, the master control program 116 monitors communications from the gaming application processes. In one embodiment, the gaming application processes must request communication facilities (e.g., sockets, ports, etc.) from the master control program 116. As a result, the master control program 116 can monitor the sockets, ports, and other communication facilities used by the gaming application processes. The flow continues at block 506.

At block 506, the master control program 116 monitors gaming machine resource usage. In one embodiment, gaming application processes must request a gaming machine resources from the master control program 116. As a result, the master control program 116 can monitor resource usage, such as memory usage, CPU usage, etc. The flow continues at block 508.

At block 508, the master control program 116 determines whether the communications/resource usage is normal. If the communications/resource usage is normal, the flow continues at block 502. Otherwise, the flow continues at block 510.

At block 510, the master control program 116 records information about the abnormality in the fault log 112. From block 510, the flow can proceed with fault recovery operations and/or security operations. Fault recovery operations are described in FIG. 6, while security operations are described in FIG. 7. The flow continues at "A", which flows into block 602 of FIG. 6 and into block 702 of FIG. 7. In one embodiment, the flow 500 continues with FIGS. 6 and 7 in parallel. In another embodiment, the flow can proceed with either FIG. 6 or FIG. 7. This description continues with FIG. 6.

FIG. 6 is a flow diagram illustrating operations for implementing a fault recovery escalation policy, according to example embodiments of the invention. The flow 600 begins with "A", which flows into block 602.

At block 602, the master control program 116 stops and restarts one or more gaming application processes associated with the abnormality. For example, the master control program 116 stops and restarts a gaming application process associated with extremely high CPU usage. In one embodiment, the master control program 116 restarts only gaming processes that are in a fault condition. As such, if the abnormality indicates a fault condition, the master control program 116 stops and restarts the gaming process. The flow continues at block 604.

At block 604, the master control program 116 determines whether the "stop and restart" operation was successful. In one embodiment, a fault recovery operation is not successful if the recovery operation has been performed more than a particular number of times in a given time period. For example, if the flow 600 arrives at the "stop and restart" operation of block 602 more than three times per hour, the fault recovery operation is not successful. In one embodiment, each time the master control program 116 performs a fault recover operation, it increments a counter associated with that operation. When the counter exceeds a given threshold, the master control process 116 intensifies its fault recovery efforts by proceeding on the "no" path to more fault recovery operations. Therefore, upon a fourth execution of block 602 within one hour, the flow 600 proceeds along the "no" path to block 606. Otherwise, the flow continues to block 620.

At block 606, the master control program 116 stops and restarts all gaming application processes associated with the abnormality. In one embodiment, the master control program 116 restarts the entire application that includes the faulting process. The flow continues at block 608.

At block 608, if the "stop and restart" of block 606 was successful (e.g., if the fault recovery counter associated with the operation at block 606 is less than a specified threshold), the flow continues at block 620. Otherwise, the flow continues at block 610.

At block 610, the master control program 116 stops and restarts all gaming applications. The flow continues at block 612.

At block 612, if the "stop and restart" of block 610 was successful, the flow continues at block 620. Otherwise, the flow continues at block 614.

At block 614, the master control program 116 reboots the gaming machine's operating system 130. The flow continues at block 616.

At block 616, if the "stop and restart" of block 614 was successful, the flow continues at block 620. Otherwise, the flow continues at block 618.

At block 618, the master control program clears the gaming machine's non-volatile memory. For example, the master control program 116 erases all the process state information from the flash RAM 108. As a result, certain processes will acquire their initial default state instead of their last stored state. The flow continues at block 620.

At block 620, the master control program 116 records any action taken. For example, the master control program 116 records the fault recovery operations in a fault log. From block 620, the flow continues at "B," which flows into block 502 of FIG. 5.

While FIG. 6 describes operations of a fault recovery escalation policy, FIG. 7 describes security operations. This description continues with FIG. 7.

FIG. 7 is a flow diagram illustrating operations for securing a gaming machine, according to example embodiments of the invention. As noted above, the operations of the flow diagram 700 continue from the process monitoring operations of FIG. 5. Therefore, in one embodiment, the operations of the flow 700 are performed in response to detecting abnormalities associated with processes executing on a gaming machine. The flow 700 begins with "A," which flows to block 702.

At block 702, the master control program 116 terminates all unapproved processes, if needed. At block 502 of FIG. 5, the master control program 116 determined whether there were any unapproved processes running on the gaming machine. Now, it terminates any unapproved processes. The flow continues at block 704.

At block 704, the master control program 116 prevents or closes unapproved connections, if needed. For example, based at least in part on abnormalities detected in the operations of FIG. 5, the master control program 116 terminates a process's connection to a port, socket, network connection, or other communication facility. In one embodiment, the master control program 116 records application processes' port usage. Because the master control program 116 "knows" what communication facilities each process is using, it can allow processes to transmit approved communications through a firewall. The flow continues at block 706.

At block 706, the master control program 116 records any action taken. For example, the master control program 116 records the fault recovery operations in a fault log. From block 706, the flow continues at "B," which flows into block 502 of FIG. 5.

While FIGS. 3-7 describe operations for launching and monitoring gaming applications, FIGS. 8-10 describe other operations. In particular, FIG. 8 describes operations for upgrading software, whereas FIG. 9 describes naming services and FIG. 10 describes maintaining a list of connections. This description continues with FIG. 8.

FIG. 8 is a flow diagram illustrating operations for upgrading software, according to example embodiments of the invention. Although the operations of FIG. 8 describe "upgrading" software, embodiments are not limited to "upgrading," as they may also "downgrade" or otherwise modify gaming software. The flow 800 commences at block 802.

At block 802, the master control program 116 receives a selection of a gaming application process that is to be upgraded. In one embodiment, the master control program 116 receives the selection from a technician through a graphical user interface. In another embodiment, the master control program 116 program receives process upgrade selections from gaming content servers that have updated gaming application processes. The flow continues at block 804.

At block 804, the master control program 116 stops monitoring the selected gaming application process. In one embodiment, the master control program 116 removes the selected gaming application process from a list of monitored processes, thereby ceasing monitoring of the selected process. The flow continues at block 806.

At block 806, the master control program 116 performs a graceful shutdown of the gaming application process. For example, the master control program 116 can reclaim system resources allocated to the application process, remove the application process from various lists (e.g., the list of executing processes), and perform other operations for shutting down the application process. For example, the master control program 116 saves state information of running processes and causes the running processes to save needed data before the gaming machine 102 shuts-down. In one embodiment, when the master control program 116 allows processes to complete any outstanding work (e.g., spooling print jobs, saving application data, etc.) and prevents them from starting new work that is not part of the shut-down process. The flow continues at block 808.

At block 808, the master control program 116 upgrades the gaming application process. In one embodiment, master control program 116 replaces one or more software files associated with the gaming application process. In another embodiment, the master control program 116 does not directly upgrade the gaming application process. Instead, it could record information or take other action that causes another application to upgrade the gaming application process. The flow continues at block 810.

At block 810, the master control program 116 starts the gaming application process. The flow continues at block 812.

At block 812, the master control program 116 starts monitoring the gaming application process. The flow continues at block 814.

At block 814, the master control program 116 instructs the gaming application process began providing services. From block 814, the flow ends.

This description continues with a discussion of naming services.

FIG. 9 is a flow diagram illustrating operations for providing naming services for gaming applications, according to example embodiments of the invention. The flow diagram 900 commences at block 902.

At block 902, the master control program 116 receives registrations of one or more services, wherein the registrations include network addresses. In one embodiment, services such as audio services, video services, wide area progressive services, etc. register their addresses with the master control program 116. In one embodiment, the master control program 116 stores the addresses and a service address table. The flow continues at block 904.

At block 904, the master control program 116 receives a request for a service address from a prospective client. In one embodiment, gaming application processes request for service addresses for various services (e.g., audio services). The flow continues at block 906.

At block 906, the master control program 116 looks-up one or more addresses of the service. In one embodiment, the master control program 116 looks-up the service's address in a service address table. From block 906, the flow continues at block 908.

At block 908, the master control program determines whether there is more than one address associated with the requested service. If there is more than one address, the flow continues at block 910. Otherwise, the flow continues at block 912.

At block 910, based on the network topology, the master control program determines the best address for the service. In one embodiment, the master control program 116 is programmed a priori to know which service address is "best" for the requestor. In another embodiment, the master control program 116 queries a database for this information. The flow continues at block 912.

At block 912, the master control program 116 transmits the address to the requester. From block 912, the flow ends.

While FIG. 9 describes address naming services, FIG. 10 describes operations for maintaining a list of connections. This description continues with FIG. 10.

FIG. 10 is a flow diagram illustrating operations for maintaining a list of connections used by processes executing on a gaming machine, according to example embodiments of the invention. The flow diagram 1000 commences at block 1002.

At block 1002, the master control program 116 maintains a list of connections between local gaming application processes and gaming application processes executing on different gaming entities. The flow continues at block 1004.

At block 1004, the master control program transmits communications to master control programs of the different gaming entities, in order to determine whether they are properly responding to communications. The flow continues at block 1006.

At block 1006, the master control program 116 determines whether any of the different master control programs are not responding properly. If they are not responding properly, the master control program informs local gaming applications about the non-responsive master control programs. The flow continues at block 1008.

At block 1008, the master control program 116 requests form a remote master control program a list of services running on the remote machine. The flow continues at block 1010.

At block 1010, for gaming processes having connections with services that are not in the list, the master control program 116 informs those gaming processes that the connections are not longer valid. From block 1010, the flow ends.

General

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration.

Herein, block diagrams illustrate exemplary embodiments of the invention. Also herein, flow diagrams illustrate operations of the exemplary embodiments of the invention. The operations of the flow diagrams are described with reference to the exemplary embodiments shown in the block diagrams. However, the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel.

The invention claimed is:

1. A gaming device comprising:

a memory unit including, one or more gaming applications; and a master control program to:

begin execution of the one or more gaming applications as one or more gaming application processes, each of the one or more gaming application processes including a security key;

monitor the one or more gaming application processes;

determine that one of the one or more gaming application processes is a rogue application because the one gaming application process did not communicate its security key to the master control program;

terminate the rogue application; and perform fault recovery operations associated with abnormalities of the rogue application; and a persistent storage including, one or more fault logs to store records of the fault recovery operations; and one or more configuration files to store information for configuring the one or more gaming applications.

2. The gaming device of claim 1, wherein to start the one or more gaming applications the master control program is to, transmit configuration information to ones of the gaming applications; and cause the gaming applications to begin providing services.

3. The gaming device of claim 1, wherein to monitor processes of the one or more gaming applications, the master control program is to perform operations selected from the group consisting of determining whether all required gaming application processes are running, determining whether any unapproved processes are running, monitoring communications from the gaming application processes, and monitoring resources of a gaming machine on which the processes are running.

4. The gaming device of claim 3, wherein to monitor the gaming application processes the master control program is to, determine whether utilization of resources of the gaming machine is abnormal;

determine whether communications of the gaming application processes are abnormal; and if the utilization of the resources or the communications are abnormal, log abnormalities.

5. The gaming device of claim 1, wherein the master control program is to detect an abnormality in the gaming machine, and wherein to perform the fault recovery operations, the master control program is to, perform one of a plurality of levels of fault recovery operations;

determine that the abnormality still exists; and perform an escalated level of the plurality of levels of fault recovery operations.

6. The gaming device of claim 5, wherein ones of the plurality of levels of fault recovery are selected from the group consisting of stopping and restarting one or more gaming application processes associated with the abnormality, stopping and restarting all gaming applications, rebooting the gaming machine, and clearing a random access memory of the gaming machine.

7. The gaming device of claim 5, wherein to perform the fault recovery operations the master control program is further to, determine, based on a level threshold, that the one of the plurality of levels of fault recovery operations should be performed again;

perform, again, the one of the plurality of levels of fault recovery operations; and determine, based on the level threshold, that the one of the plurality of levels should not be performed again.

8. The gaming device of claim 1, wherein the master control program is to maintain a list of connections between the processes of the one or more gaming applications on the gaming device and one or more gaming application processes executing on a different gaming device.

9. A computer-implemented method comprising:

executing, using at least one processor, one or more gaming applications that include one or more gaming application processes, wherein each of the one or more gaming applications processes includes a security key;

monitoring, using the at least one processor, the one or more gaming application processes, the monitoring including determining that one of the one or more gaming application processes is a rogue application because the one gaming application process did not communicate its security key to the master control program;

determining, using the at least one processor, based on the monitoring, that fault recovery operations are needed for the rogue application; and performing, using the at least one processor, the fault recovery operations, the fault recovery options including terminating the rogue application.

10. The computer-implemented method of claim 9, wherein the starting of the one or more gaming applications includes, transmitting configuration information to ones of the gaming applications; and causing the gaming applications to begin providing services.

11. The computer-implemented method of claim 9, wherein the monitoring of the gaming application processes is selected from the group consisting of determining whether all required gaming application processes are running, determining whether any unapproved processes are running, monitoring communications from the gaming application processes, and monitoring resources of a gaming machine on which the processes are running.

12. The computer-implemented method of claim 11, wherein the monitoring of the gaming application processes includes, determining whether utilization of resources of the gaming machine is abnormal;

determining whether communications of the gaming application processes are abnormal; and if the utilization of the resources or the communications are abnormal, logging abnormalities.

13. The computer-implemented method of claim 9, wherein the determining that the fault recovery operations are needed includes detecting an abnormality in the gaming machine, and wherein the performing of the fault recovery operations includes, performing one of a plurality of levels of fault recovery operations;

determining that the abnormality still exists; and performing an escalated level of the plurality of levels of fault recovery operations.

14. The computer-implemented method of claim 13, wherein ones of the plurality of levels of fault recovery are selected from the group consisting of stopping and restarting one or more gaming application processes associated with the abnormality, stopping and restarting all gaming applications, rebooting the gaming machine, and clearing a random access memory of the gaming machine.

15. The computer-implemented method of claim 13, wherein the performing of the fault recovery operations further includes, determining, based on a level threshold, that the one of the plurality of levels of fault recovery operations should be performed again;

performing, again, the one of the plurality of levels of fault recovery operations; and determining, based on the level threshold, that the one of the plurality of levels should not be performed again.

16. The computer-implemented method of claim 9, further comprising maintaining a list of connections between one or more gaming application processes executing on a local gaming device and one or more gaming application processes executing on a different gaming device.

17. A non-transitory computer-readable medium including instructions, which when executed by a machine, cause the machine to perform operations comprising:

receiving, at a master control program, a selection of a gaming application process to be upgraded;

performing, using the master control program, a graceful shutdown of the gaming application process;

modifying, using the master control program, the gaming application process;

executing, using the master control program, the gaming application process;

beginning monitoring, using the master control program, of the executing gaming application process;

instructing, using the master control program the gaming application process to begin providing services;

determining, using the master control program, that the gaming application process comprises a rogue application when the gaming application process does not communicate its security key to the master control program at a designated time; and terminating the rogue application.

18. The non-transitory computer-readable medium of claim 17, wherein the modifying of the gaming application process includes replacing a file with a more current file or an older file.

19. The non-transitory computer-readable medium of claim 17, wherein the performing of the graceful shutdown of the gaming application process includes allowing the gaming application process to complete transactions associated with the gaming application process.

* * * * *

UNITED STATES PATENT AND TRADEMARK OFFICE

CERTIFICATE OF CORRECTION

PATENT NO. : 8,568,226 B2
APPLICATION NO. : 11/995384
DATED : October 29, 2013
INVENTOR(S) : Smith et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1465 days.

Signed and Sealed this
Fifteenth Day of September, 2015

Michelle K. Lee
*Director of the United States Patent and Trademark Office*